3,585,019
FERTILIZER COMPOSITION CONTAINING METHYLENE BIS ($C_1$-$C_4$ ALKYLUREA) MATERIAL

John T. Hays, New Castle County, Del., assignor to Hercules Incorporated, Wilmington, Del.
No Drawing. Continuation-in-part of abandoned application Ser. No. 732,830, May 29, 1968, which is a continuation-in-part of application Ser. No. 631,160, Apr. 17, 1967. This application July 15, 1969, Ser. No. 842,012

Int. Cl. C09c 9/00

U.S. Cl. 71—28                                6 Claims

ABSTRACT OF THE DISCLOSURE

Disclosed is methylene bis(isopropylurea) which has utility as a fertilizer. It has a unique property of substantially constant rate of release of nitrogen under nitrification conditions. Also disclosed is a fertilizer composition characterized by the presence of methylene bis($C_1$-$C_4$ alkylurea) material.

---

The application is a continuation-in-part of copending application, Ser. No. 732,830, filed May 29, 1968, for Fertilizer Containing a Methylene Bis(Alkylurea), and now abandoned, which in turn is a continuation-in-part of the copending application, Ser. No. 631,160, filed Apr. 17, 1967, and now abandoned.

This invention is in the chemical arts. More particularly it relates to ureas and to fertilizer compositions containing ureas.

Many common fertilizer compositions contain as the nitrogen component nitrogenous material characterized by marked solubility in water. Examples of such material are ammonium sulfate, ammonium nitrate, urea and liquid ammonia. Due to the high solubility of such material it is rapidly leached out of the soil by rainfall or ground water, resulting in loss of plant nitrogen.

In recent years considerable work has been carried out to find nitrogenous compounds which are much less soluble in water, but which nevertheless eventually make nitrogen available to plants. Up to now one of the best nitrogenous compounds resulting from this work is ureaform, a product of condensation of urea with formaldehyde.

Ureaform has been fairly widely accepted and used in agriculture because it is not leached quickly from the soil by water. Moreover, the use of ureaform presents very little danger of "burning," which happens with water-soluble fertilizers such as ammonium nitrate and urea, and does not present the problem of too rapid an uptake of nitrogen, which results in lush plant growth that lacks strength and is susceptible to damage by diesease, insects and drought. However, ureaform does not release nitrogen at constant rate. In this regard, plants derive nitrogen from nitrates present in the soil. When soil is fertilized with nitrogen compounds other than nitrates, under normal conditions a biological process which converts these nitrogen compounds into plant assimilable nitrates takes place. This process is referred to as nitrification. It comprises conversion by a wide variety of organisms in the soil of the non-nitrate nitrogen compounds into ammonia. Ammonia is oxidized to nitrite by a specific class of bacteria known as Nitrosomonas. Nitrite is oxidized to nitrate by another specific class of bacteria identified as Nitrobacter. In the case of ureaform, nitrification or the rate of released nitrogen is quite rapid in the first few weeks after application to soil. This is due to the presence of a relatively large, low molecular weight fraction. Thereafter, nitrification proceeds at a much slower rate. Indeed, the rate is so slow that the total nitrogen content of ureaform is not made available during the life of single crops.

Other products have been found which nitrify during a single growing season to a much greater extent than does ureaform. Exemplary of these other products are the diureas obtained by condensation of urea with n-butyraldehyde and with isobutyraldehyde. Although these products are classified as slow nitrogen release compounds, they are lower in molecular weight than ureaform and contain larger amounts of the simple diureas, thereby resulting in a faster release of nitrogen than in the case of ureaform. This is due at least in part to the greater susceptibility of the diureas to hydrolysis. Here again, however, the nitrification rate is not constant.

This invention provides nitrogenous compounds with substantially constant nitrification rates. These compounds are methylene bis($C_1$-$C_4$ alkylureas). They are methylene bis(methylurea), methylene bis(ethylurea), methylene bis(n-propylurea), methylene bis(isopropylurea), methylene bis(n-butylurea), methylene bis(sec. butylurea) and methylene bis(tert. butylurea). The outstanding methylene bis($C_1$-$C_4$ alkylurea) is methylene bis(isopropylurea) which has the formula:

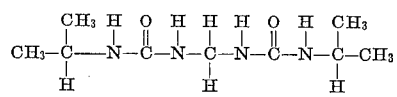

When this compound is utilized as a fertilizer, it exhibits a unique behavior in that its nitrification rate is almost constant.

For use as fertilizers the methylene bis($C_1$-$C_4$ alkylureas) of this invention are preferably, although not necessarily, incorporated into embodiments of the fertilizer composition of the invention.

The fertilizer composition of this invention comprises methylene bis($C_1$-$C_4$ alkylurea) material at an effective concentration and a normally solid fertilizer extender. In some embodiments of the composition the methylene bis($C_1$-$C_4$ alkylurea) material consists essentially of one of the methylene bis($C_1$-$C_4$ alkylureas). In other embodiments it consists essentially of more than one, for example, two or more, of the methylene bis($C_1$-$C_4$ alkylureas). The extender can comprise an inert solid such as peat, sand, clay, vermiculite, and the like. It can comprise another solid plant nutrient. For instance, it can comprise another nitrogenous compound such as, for example, ammonium nitrate, urea, and the like. It can comprise compounds containing potassium and phosphorus values, such as, for example, monosodium phosphate, disodium phosphate, calcium phosphate, superphosphate, monopotassium phosphate, potassium sulfate, potassium nitrate, potassium chloride, diammonium phosphate, and the like.

Furthermore, the fertilizer composition of this invention also can comprise herbicidal, soil fungicide, and insecticidal components. Exemplary of these are the phenoxycarboxylic acids and their derivatives, such as 2,4-D, 2,4,5-T, MCPA and silvex, urea derivatives such as monuron, diuron and norea, dimethyltetrachloroterephthalate, 2,6-di-t-buty-4-methylphenyl N-methyl-carbamate, pentachloronitrobenzene, captan, and the like.

The fertilizer composition of this invention is normally in a solid particle state with particle sizes in a range from about 200 mesh up to about 10 mesh, U.S. screen size. Larger and smaller particle sizes are within the broader concepts of this invention, however.

The fertilizer composition of this invention is made by conventional ways and means.

The fertilizer composition of this invention is used by applying by conventional ways and means to soil to be fertilized. Rates of application depend on the formulation of the composition, and on the crop or plant to be fertilized. In general an effective rate of application is employed.

The best mode now contemplated of carrying out this invention is illustrated by the following working examples of various aspects of this invention, including specific embodiments. This invention is not limited to these specific embodiments. In the examples all parts and percentages are by weight unless otherwise specified.

EXAMPLE 1

This example illustrates methylene bis(isopropylurea) and how to make it.

A reaction vessel is charged with 5.0 parts of isopropylurea (which can be prepared as disclosed in Example 5 of the U.S. Patent 3,161,677, to Schlatter), 1.5 parts of aqueous 44% formaldehyde and 5.0 parts of water. The resulting mixture is heated to 60° C. to give a clear solution. The pH of this solution is adjusted to 8.0 by the addition of aqueous 10% sodium hydroxide, and the solution then is maintained at 60–65° C. for one hour. Upon acidification with aqueous 50% sulfuric acid to a pH of about 1.0, a white solid precipitates from the reaction mixture. Within a few minutes, the pH of the reaction mixture is adjusted to about 8.0 with aqueous 10% sodium hydroxide, after which the mixture is cooled to 10–15° C. The solids are filtered off, washed with water and then dried. The product (4.8 parts) thus obtained consists essentially of methylene bis(isopropylurea). It typically has a melting point of 210–212° C., and a typical analysis is: N=25.8% (calculated: N=25.9%). The product upon analysis by the standard AOAC Activity Index procedure (Assoc. Offic. Agr. Chemists, "Official Methods of Analysis," 9th ed., p. 15, 1960), typically analyzes 19.0% cold water insoluble nitrogen and 4.9% hot water insoluble nitrogen, whereby it has a typical activity index value of 74.

EXAMPLE 2

This example illustrates methylene bis(n-propylurea) and how to make it.

Following the procedure of Example 1, a product consisting essentially of methylene bis(n-propylurea) is prepared from n-propylurea and formaldehyde. A typical analysis of the product gives 25.8% nitrogen. (The theoretical amount is 25.9%.) Also, the product typically contains 19.0% cold water insoluble nitrogen and 1.2% hot water insoluble nitrogen, thereby having an activity index value of 94.

EXAMPLE 3

This example illustrates methylene bis(n-butylurea) and how to make it.

Following the procedure of Example 1, a product consisting essentially of methylene bis(n-butylurea) is synthesized from n-butylurea and formaldehyde. A typical analysis of the product gives 22.8% nitrogen (the theoretical value is 22.9%), 21.4% cold water insoluble nitrogen and 16.2% hot water insoluble nitrogen, thereby giving an activity index of 24.

EXAMPLE 4

This example illustrates a preferred specific embodiment of the fertilizer composition of this invention, which embodiment is characterized as a 15–5–5 lightweight fertilizer composition.

The formulation of this embodiment is:

| Components: | Parts |
|---|---|
| Methylene bis(isopropylurea) | 58 |
| Triple superphosphate (45% $P_2O_5$) | 10.9 |
| Muriate of potash (KCl) | 8.1 |
| Vermiculite | 23 |

Each of the components is in particle form with the particle size preferably being in a range from about 16 to about 200 mesh, U.S. screen size.

The composition of this formulation is made by admixing the components, granulating the mixture with steam to form granules in a range of from about 6 to about 40 mesh, U.S. screen size, and drying the granules.

The composition is applied to turf, for example, at a rate of 25–30 pounds per thousand square feet.

EXAMPLE 5

This example illustrates another preferred specific embodiment of the fertilizer composition of this invention, which embodiment is characterized as a 15–10–5 lightweight fertilizer composition.

The formulation of this embodiment is:

| Components: | Parts |
|---|---|
| Methylene bis(isopropylurea) | 38.7 |
| Urea | 3.1 |
| Muriate of potash | 8.4 |
| Vermiculite | 25.0 |
| Ammonium phosphate solution | 42.5 |

The composition of the ammonium phosphate solution is:

| Ingredients: | Percent |
|---|---|
| Diammonium phosphate | 39.0 |
| Phosphoric acid | 3.8 |
| Water | 57.2 |

The solid components (first four in list of components) of the formulation are in particle form with the particle sizes in a range from about 6 to about 200 mesh, U.S. screen size.

This embodiment is made by mixing the solid components of the formulation, adding the ammonium phosphate solution to the mixture, granulating the resulting mixture, and then drying the granules.

This specific fertilizer composition is applied to turf, for example, at a rate of 25–30 pounds per thousand square feet.

The nitrification properties of the methylene bis($C_1$–$C_4$ alkylureas) of this invention are demonstrated by the following data obtained by the following test procedure. A sample of the compound to be tested is mixed with a weighed quantity of specially selected and treated soil. The resulting mixture is moistened and incubated at 30° C. The amount of nitrogen in the form of nitrate present in the soil at the start of the test and at specified intervals of 3, 6, 9, 12, 15 and 24 weeks is determined by extracting samples of the soil with water and applying the phenoldisulfonic acid colorimetric test (H. J. Harper, Ind. Eng. Chem. 16, 180 (1924)), utilizing a spectrophotometer capable of measuring absorbance at 410 m$\mu$. The following table presents the data thus obtained.

TABLE

| | Percent conversion of N to $NO_3$— | | | | | |
|---|---|---|---|---|---|---|
| Weeks | 3 | 6 | 9 | 12 | 15 | 24 |
| Test compound: | | | | | | |
| Methylene bis(methylurea) | 22.5 | 42.5 | 59.0 | 75.0 | 89.0 | 94.9 |
| Methylene bis(ethylurea) | 13.7 | 47.4 | 74.9 | 90.6 | 97.4 | |
| Methylene bis(isopropylurea) | 8.2 | 14.7 | 23.4 | 35.0 | 45.7 | 69.8 |
| Methylene bis (n-propylurea) | 2.7 | 15.7 | 24.5 | 40.0 | 55.0 | |
| Methylene bis (n-butylurea) | 4.0 | 11.9 | 29.7 | 50.0 | 67.0 | |
| Ureaform | 37.0 | 51.5 | 58.5 | | 67.5 | 73.5 |
| Isobutylidene diurea | 38.0 | 71.0 | 77.0 | | | |
| Ammonium sulfate | 89.5 | 93.0 | 99.0 | | | |

The methylene bis($C_1$–$C_4$ alkylureas) of this invention are structurally different from other urea type compounds previously disclosed in the fertilizer art. They also exhibit an entirely different nitrification pattern, as is readily apparent from the preceding table, which shows nitrification rates for methylene bis(methylurea) methylene bis (ethylurea), methylene bis(isopropylurea), methylene bis (n-propylurea), methylene bis(n-butylurea), ureaform, isobutylidene diurea and ammonium sulfate. As shown by the tabulated data, a soluble compound such as ammonium sulfate releases all of its nitrogen quickly and then stops. Isobutylidene diurea and ureaform also liberate much of their nitrogen in the first few weeks and then give a continued substantially less rate of release. The gradual release of nitrogen over measured periods by the methylene bis($C_1$–$C_4$ alkylureas) of this invention and, in particular, the almost constant rate of release exhibited by methylene bis(isopropylurea) are in marked contrast to the prior art compounds. Based on these properties, the methylene bis($C_1$–$C_4$ alkylureas) of this invention are most useful as fertilizers for turfgrass and certain long-season crops, which desirably utilize nitrogen at a nearly constant rate.

Other features, advantages, and specific embodiments of this invention will become readily apparent to those exercising ordinary skill in the art after reading the foregoing disclosures. In this connection, while specific embodiments of this invention have been described in considerable detail, variations and modifications of these embodiments can be effected without departing from the spirit and scope of the invention as disclosed and claimed.

The term "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

What I claim and desire to protect by Letters Patent is:

1. A fertilizer composition comprising in admixture at an effective concentration material selected from the group of methylene bis($C_1$–$C_4$ alkylureas), and solid fertilizer extender.

2. A fertilizer composition according to claim 1, wherein said material consists essentially of methylene bis(isopropylurea).

3. A solid fertilizer composition comprising in admixture at an effective concentration material selected from the group of methylene bis($C_1$–$C_4$ alkylureas), and solid fertilizer extender comprising at an effective concentration other plant nutrient material.

4. A solid fertilizer composition according to claim 3, wherein said solid fertilizer extender comprises solid inert material.

5. A method of fertilizing soil, which comprises adding to said soil an effective quantity of material selected from the group consisting of methylene bis($C_1$–$C_4$ alkylureas).

6. A method according to claim 5, wherein said material consists essentially of methylene bis(isopropylurea).

References Cited

UNITED STATES PATENTS 1,883,718  10/1932  Gether _____ 260—553X

OTHER REFERENCES

Kadowaki, H.: New Compounds of Urea-Formaldehyde Condensation Products, Bull. Chem. Soc., Japan, 11: #3, 249, 256–257 (1936).

Smythe L. E.: Urea-Formaldehyde Kinetic Studies. IV Reactions of Methylenebisureas, J. Am. Chem. Soc., 75: 1508–10 (1953).

Nitroform, Manufacturers Handbook, received in Office 1956, pp. 4 and 5.

REUBEN FRIEDMAN, Primary Examiner

R. BARNES, Assistant Examiner